Patented Dec. 13, 1938

2,140,248

UNITED STATES PATENT OFFICE 2,140,248

COLOR LAKES

Walther Retter, Cologne-Deutz, Ottmar Wahl, Leverkusen-I. G. Werk, and Werner Müller, Cologne, Germany, assignors to General Aniline Works, Inc., New York, N. Y., a corporation of Delaware No Drawing. Application November 7, 1935, Serial No. 48,790. In Germany November 23, 1934

10 Claims. (Cl. 134—58.5)

The present invention relates to color lakes which are fast to light.

It is known from literature, compare, for example, United States Patent 1,653,851 to prepare color lakes which are fast to light by treating in substance or on a substratum basic dyestuffs which may contain acid groups, with mineral hetero-poly-acids selected from the group consisting of the acids containing a plurality of radicals of phosphoric, silicic, molybdic and tungstic-acids, such as phosphotungstic acid, phosphomolybdic acid, phosphotungstomolybdic acid, silicotungstic acid and the like. In the manufacture of the color lakes the complex acids themselves can be used, or the dyestuffs can be simultaneously or successively treated with the components of the complex compounds. Up to the present this process has been of practical value only for the dyestuffs of the triarylmethane series.

In accordance with the present invention methine dyestuffs, compare, for example, U. S. Patent 1,524,791 to Walter Koenig, U. S. Patent 1,899,122 (Ciba) to Richard Tobler et al., U. S. Patent 1,910,478 to Karl Schmidt, U. S. Patent 1,910,479 to Karl Schmidt, British Patent 353,863, British Patent 328,357 to Richard Kuhn et al., and French Patent 737,337, which may contain acid groups, such as dyestuffs of the carbocyanine and styryl series, containing an indoline nucleus, are particularly valuable starting materials for the manufacture of color lakes which are fast to light according to the general process set out above. In this manner new color lakes are obtained of a clarity unknown up to the present time, and which, compared with the analogously prepared lakes from triarylmethane dyestuffs, are further distinguished by remarkable advantages, for example by an improved fastness to oil, spirit and light. This surprising result could not be forseeen, because the methine dyestuffs generally show such insufficient fastness properties that they have scarcely at all been used as textile dyestuffs and compared with triarylmethane dyestuffs they are generally inferior as regards fastness to light. From the above it follows that by treatment with the above complex compounds the improvement as regards the fastness properties of the methine dyestuffs is considerably higher than that of the dyestuffs of the triarylmethane series.

The present process provides the technical advance that it renders available color lakes of a clearness and brilliance combined with excellent fastness properties unknown up to the present time.

The invention is illustrated by the following examples, but is not restricted thereto:

Example 1

A solution of 10 parts by weight of the dyestuff of the following constitution:

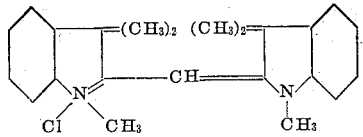

in 1000 parts by weight of hot water is precipitated with 20 parts by weight of a complex phosphotungstomolybdic acid. There is obtained a brilliant yellow precipitate of very good fastness properties.

Example 2

A solution of 5 parts by weight of a dyestuff of the following constitution:

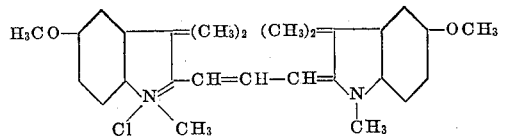

in 100 parts by weight of boiling water is stirred with 100 parts by weight of an aluminium hydroxide paste of 10% strength, and the dyestuff is precipitated by adding 7.5 parts by weight of a complex silicotungstic acid. There is obtained a brilliant violet printing color of very good fastness properties.

The dyestuff of the following constitution:

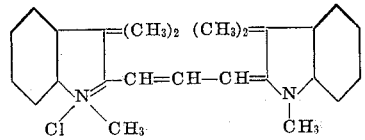

yields more reddish color lakes.

In an analogous manner the dyestuff of the following constitution:

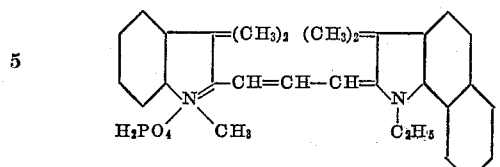

yields a bright violet color lake.

The dyestuff of the following constitution:

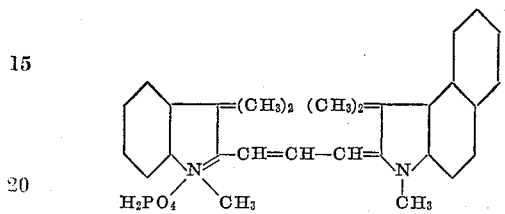

yields a bright reddish-violet color lake.

*Example 3*

A solution of 5 parts by weight of the dyestuff of the following constitution:

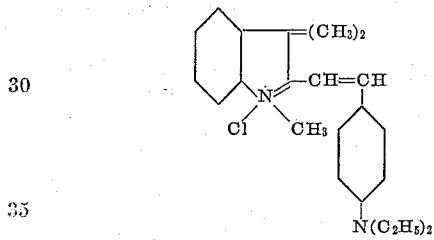

in 1000 parts by weight of boiling water is stirred with a paste prepared from 50 parts by weight of heavy spar, aluminum hydroxide in a quantity corresponding to 10 parts by weight of aluminium sulphate (18% $Al_2O_3$), and an aqueous barium chloride solution of 10% strength corresponding to 12 parts by weight of barium chloride, and thereto are added 7.5 parts by weight of a complex phosphotungstic acid. There is obtained a brilliant reddish-violet precipitate of excellent clearness and fastness to light, spirit and water, and suitable as a color lake for wall paper.

Lakes of similar shades are obtained with the dyestuffs of the following constitution:

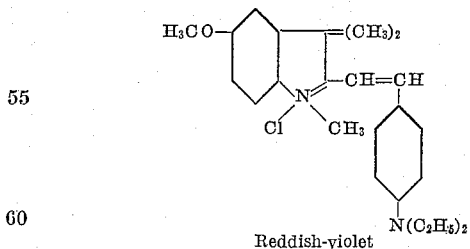
Reddish-violet

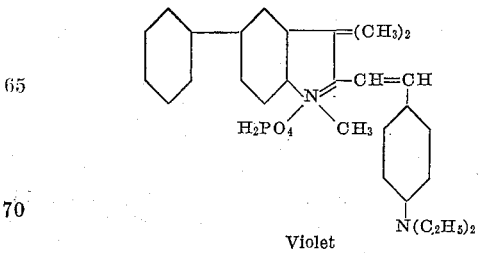
Violet (prepared by condensing 1 molecular proportion of 1,3,3-trimethyl-5-phenyl-2-methylene-indoline and 1 molecular proportion of p-diethylaminobenzaldehyde in glacial acetic acid and salting out with sodium phosphate. The indoline used as starting component is obtainable by dimethylating, for example with $ICH_3$, 2,3-dimethyl-5-phenylindole which latter compound can be prepared according to the directions given in British Patent No. 409,350.)

or

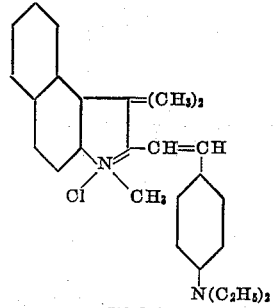
Violet or

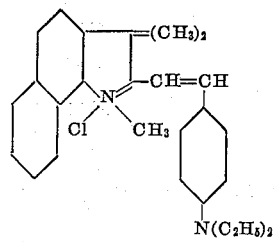
Bluish-violet or

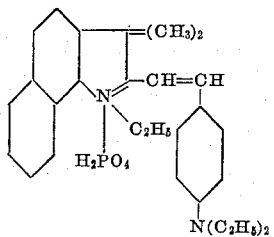
Bluish-violet

*Example 4*

A hot solution of 20 parts by weight of the dyestuff of the following constitution:

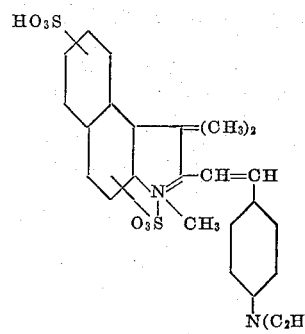

(prepared by condensing 1 molecular proportion of 1,3,3-trimethyl-2-methylene-β-naphthindoline and 1 molecular proportion of diethylaminobenzaldehyde in glacial acetic acid, salting out with common salt and sulfonating the basic dyestuff in sulfuric acid containing 20–30% of $SO_3$; the 1,3,3-trimethyl-2-methylene-β-naphthindoline is obtainable in accordance with the directions given in British Patent No. 409,350.)

and 20 parts by weight of a complex phosphotungstic acid in 4000 parts by weight of water is combined with an aluminium hydroxide paste in a quantity corresponding to 300 parts by weight of aluminium sulfate (18% $Al_2O_3$). On adding a solution of 40 parts by weight of barium chloride in 400 parts by weight of water, there is obtained the precipitate of the color lake, yielding a brilliant violet printing color of an excellent clarity and fastness to light, spirit and water.

The dyestuff of the following constitution:

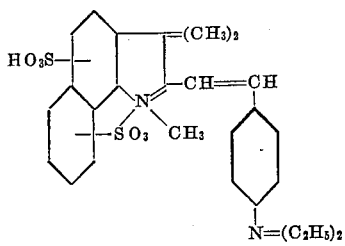

(obtainable in an analogous manner to the previous dyestuff using the corresponding α-naphthindoline instead of the β-naphthindoline.)

yields a brilliant bluish-violet printing color of similar fastness properties.

*Example 5*

The dyestuff of the constitution as shown with the first formula of Example 4 is dyed on wool from an acid bath in the usual manner and aftertreated with phosphotungstic acid or reduced phosphotungstic acid. There is obtained a bright violet shade of a fastness to light which is better than that of a dyeing non-aftertreated.

*Example 6*

The dyestuff of the following constitution:

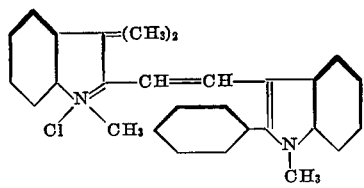

(prepared by condensing one molecular proportion of 1,3,3-trimethyl-2-methyleneindoline and one molecular proportion of 1-methyl-2-phenylindole-3-aldehyde in glacial acetic acid and salting out with common salt. The 1-methyl-2-phenylindole-3-aldehyde is obtainable in accordance with the directions given in British Patent No. 438,278), is dyed on cotton mordanted with tannin or potassium antimonyl tartrate in the usual manner and aftertreated with phosphotungstomolybdic acid or reduced phosphotungstic acid for ¾ hours at 25–30° C. There is obtained a bright orange shade of a fastness to light improved in comparison with a dyeing non-aftertreated.

When treating in substance the methine dyestuff of the above formula with phosphotungstomolybdic acid, there is obtained a bright orange precipitate fast to light, suitable for yielding valuable lakes.

We claim:

1. A lake comprising a methine dyestuff of the following formula:

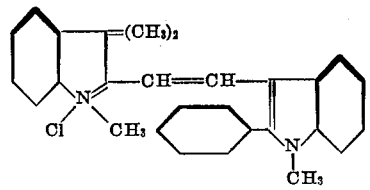

associated with a mineral hetero-poly-acid selected from the group consisting of acids containing a plurality of radicals of phosphoric, silicic, molybdic and tungstic acids, being a bright orange substance of good fastness to light, suitable for yielding valuable color lakes.

2. A lake comprising a methine dyestuff of the formula in claim 1, associated with a complex phosphotungstomolybdic acid, being a bright orange substance of good fastness to light, suitable for yielding valuable color lakes.

3. A lake comprising a methine dyestuff of the following formula:

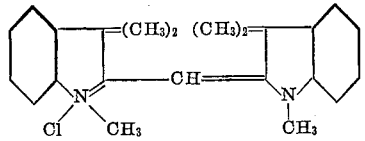

associated with a mineral hetero-poly-acid selected from the group consisting of acids containing a plurality of radicals of phosphoric, silicic, molybdic and tungstic acids, being a brilliant yellow substance of good fastness to light.

4. A lake comprising a methine dyestuff of the formula in claim 3, associated with a complex phosphotungstomolybdic acid, being a brilliant yellow substance of good fastness to light.

5. A lake comprising a methine dyestuff of the following formula:

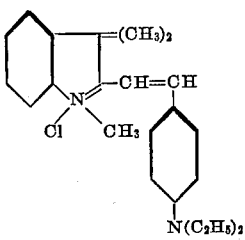

associated with a mineral hetero-poly-acid selected from the group consisting of acids containing a plurality of radicals of phosphoric, silicic, molybdic and tungstic acids, being a brilliant reddish violet substance of good fastness to light and suitable as a color lake for wall-paper.

6. A lake comprising a methine dyestuff of the formula in claim 5, associated with a complex phosphotungstic acid being a brilliant reddish violet substance of good fastness to light and suitable as a color lake for wall-paper.

7. A lake possessing a good fastness to light comprising a dyestuff of the methine series containing an indoline radical in the molecule, which dyestuff is associated with a mineral hetero-poly-acid selected from the group consisting of acids containing a plurality of radicals of phosphoric, silicic, molybdic, and tungstic acids.

8. A lake possessing a good fastness to light comprising a dyestuff of the methine series containing an indoline radical in the molecule, which dyestuff is associated with a mineral hetero-poly-acid selected from the group consisting of acids containing a plurality of radicals of phosphoric, silicic, molybdic, and tungstic acids, and a substratum of the kind generally used in the manufacture of lakes.

9. A lake possessing a good fastness to light comprising a dyestuff of the methine series containing an indoline radical in the molecule, which dyestuff is associated with a complex phosphotungstomolybdic acid.

10. A lake possessing a good fastness to light comprising a dyestuff of the methine series containing an indoline radical in the molecule, which dyestuff is associated with a complex phosphotungstomolybdic acid and a substratum of the kind generally used in the manufacture of lakes.

WALTHER RETTER.
OTTMAR WAHL.
WERNER MÜLLER.